United States Patent [19]

Mashburn et al.

[11] 4,254,332
[45] Mar. 3, 1981

[54] LASER PULSE DETECTOR

[75] Inventors: Douglas N. Mashburn; M. Alfred Akerman, both of Knoxville, Tenn.

[73] Assignee: The United States of America as represented by the United States Department of Energy, Washington, D.C.

[21] Appl. No.: 66,107

[22] Filed: Aug. 13, 1979

[51] Int. Cl.$^3$ ............................................. H01J 40/14
[52] U.S. Cl. .............................................. 250/211 R
[58] Field of Search ........................... 258/211 R, 338

Primary Examiner—David C. Nelms
Assistant Examiner—Darwin R. Hostetter

Attorney, Agent, or Firm—James E. Denny; Stephen D. Hamel; David E. Breeden

[57] ABSTRACT

A laser pulse detector is provided which is small and inexpensive and has the capability of detecting laser light of any wavelength with fast response (less than 5 nanoseconds rise time). The laser beam is focused onto the receiving end of a graphite rod coaxially mounted within a close-fitting conductive, open-end cylindrical housing so that ablation and electric field breakdown of the resulting plasma occurs due to a bias potential applied between the graphite rod and housing. The pulse produced by the breakdown is transmitted through a matched impedance coaxial cable to a recording device. The cable is connected with its central lead to the graphite rod and its outer conductor to the housing.

5 Claims, 1 Drawing Figure

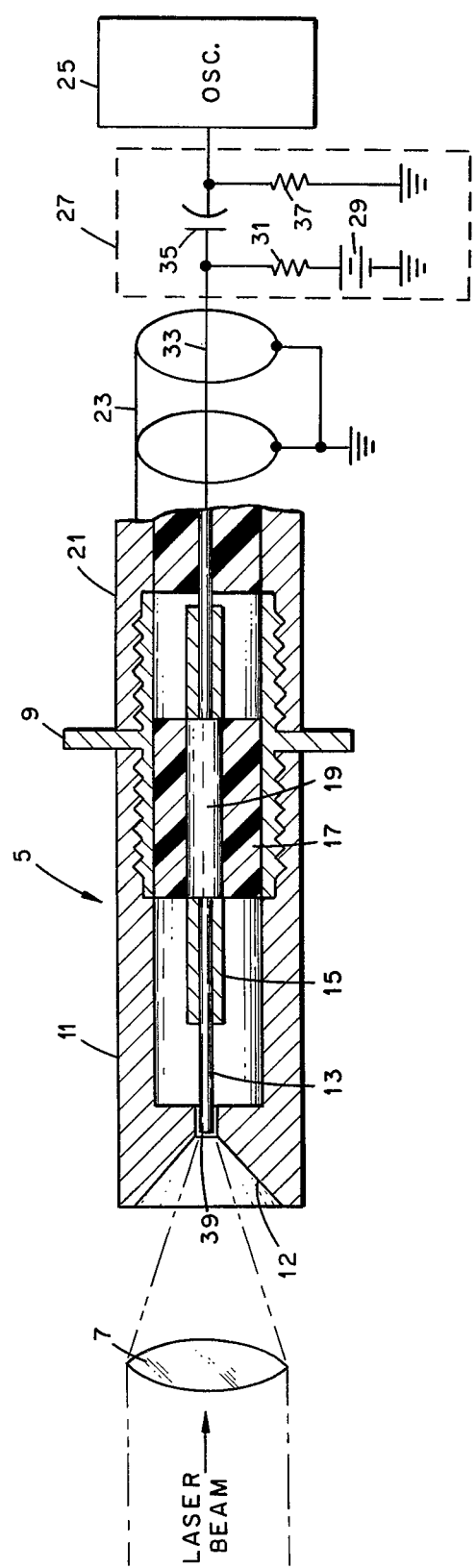

LASER PULSE DETECTOR

This invention relates generally to laser pulse detectors and more specifically to a laser pulse detector which is inexpensive to manufacture and has a fast response time for laser pulses of any light wavelength. It is a result of a contract with the U.S. Department of Energy.

BACKGROUND OF THE INVENTION

In the use and development of pulsed laser systems, extensive research into laser operation and manipulation is required. For example, in laser isotope separation processes, it is desirable to be able to detect a laser pulse and to use the signal to trigger other operations. Laser pulse detectors which are commercially available are expensive and are applicable to relatively narrow wavelength bands, i.e., infrared, visible, ultraviolet, etc.

The laser pulse detectors commercially available are of several types—the pyroelectric detector, the photon drag detector, diode detector, photomultiplier, bolometer. The pyroelectric detector has a relatively low cost but exhibits a slow response which is unacceptable for applications in which the detector response is used to trigger other operations in a process. The pyroelectric detector produces an electric current that is proportional to the rate of change of its temperature.

Vacuum photo diode detectors, one type of photo diode detector, employ a cathode in an evacuated cell, which emits electrons when struck by light. An electric field applied between the cathode and anode accelerates the electrons and the current produced is a function of light power. It can be fast but works only at the UV and visible ranges.

Semiconductor photo diode detectors utilize two semiconductor materials in sandwich form with an electric field thereacross which generates a current flow when illuminated by light. This detector can be fast but is useful only from the near ultraviolet to near IR range.

The bolometer uses a short narrow strip covered with light absorbing material. The electrical resistance of the strip changes when light strikes it due to a change in the strip's temperature.

The photomultiplier tube is similar to the vacuum photodiode but accelerates the electrons in 2 or more stages providing an amplification of the original signal. It can be fast but it is expensive and limited to visible, UV and near IR.

The photon drag detector exhibits a fast response time but is expensive and is specific for relatively narrow wavelength bands. This detector has a semiconductor as its prime element. When laser light is transmitted through the semiconductor, an electric field is induced which is a function of the laser light power.

Although all of the above-described detectors find use in specific applications, they are not generally adaptable for use as comprehensive laser pulse detectors which would be inexpensive to build and provide fast responses.

Therefore, it is a primary object of this invention to provide a laser pulse detector which is inexpensive to manufacture and is capable of detecting laser light of any wavelength.

Another object of this invention is to provide a laser pulse detector as in the above object in which the output signal has a very rapid rise time and may be used as a trigger pulse in laser utilization systems.

Other objects and many of the attendant advantages of the present invention will be obvious from the following detailed description taken in conjunction with the drawing, wherein the single FIGURE is a partially schematic illustration of a laser pulse detector according to the present invention.

SUMMARY OF THE INVENTION

Briefly, the invention is a laser pulse detector which includes an electrically conductive ablative rod coaxially disposed in an open end conductive cylinder and insulated therefrom so that a laser beam may be directed onto the exposed end of the rod. A bias voltage is applied between the rod and the cylinder so that ablation of the rod end by the laser beam forming a plasma about the rod end causes a current to flow between the cylinder and rod producing a signal. The signal, which is transmitted via a coaxial cable connected with its center lead to the rod, may be used to trigger a utilization or detecting device.

DETAILED DESCRIPTION

Referring now to the drawing, the detector assembly is shown to consist of an outer, electrically conductive cylindrical housing 5 having an open front end into which a laser beam to be detected is directed through a focusing lens 7. The housing 5 may take various forms as will be obvious from the following description of a preferred form utilizing conventional components. For example, the female portion of a standard 50 ohm BNC connector 9 may be used onto which a brass sleeve 11 is threaded to the back end thereof to form an open end chamber. An electrically conductive ablative rod, such as a 0.5 mm graphite rod 13 (pencil lead), is removably inserted into the rear receiver central conductor portion 15 of the connector which is insulated from the housing 5 by means of insulating material 17 surrounding the central conductor 19 of the connector 9.

The open end of the sleeve 11 has an internal shoulder portion 12 adjacent the front end of the rod 13 to aid in confining the plasma formed by ablative action of the laser beam focused on the front end of the rod. The close spacing between the rod 13 and shoulder 12 aids in establishing current conduction between the rod and housing during pulse detection.

The other end of the connector 9 is coupled to the male portion of a coaxial cable connector 21. The connector 21 is connected to a matching 50 ohm coaxial cable 23 which connects the detector to a utilization device, such as oscilloscope 25, through a coupling and bias voltage circuit 27. The circuit 27 may be placed at any point in the line 23 and consists of a d.c. voltage biasing source 29 and coupling capacitor 35. The positive side of the d.c. source is connected through a current limiting resistor 31 to the central conductor 33 of the cable and the negative side to ground potential. The coupling capacitor 35 is connected in series with the central conductor 33 at the output end from the biasing source and an output load resistor 37 is connected between the output side of the coupling capacitor 35 and ground potential. Thus, the output of the laser pulse detector is taken at the capacitor 35 and resistor 37 connection. The output signal may be used to trigger operations in a laser operated system or simply recorded as shown by the connection to a high speed oscilloscope 25 on which the detected pulse is displayed.

The mechanism by which the detector operates involves focusing a laser beam onto the exposed end 39 of the rod 13 such that ablation of the rod forms a plasma surrounding the rod tip in the area between the rod and the housing sleeve 11. Any necessary focusing to increase the energy/unit area above a threshold level may be accomplished by using either a focusing lens, as shown, or a focusing mirror. The plasma provides a conduction path between the sleeve 11 and rod 13 producing a pulse at the output. Laser light of any wavelength may be detected as long as the power density of the beam focused on the graphite surface exceeds about 50 kilowatts/mm$^2$. This energy level is sufficient to produce sufficient plasma for conduction. The conduction produces a current pulse on the central conductor which is coupled through capacitor 35 to the oscilloscope 25 input. All components of the detector system must be impedance matched to avoid distortion or reflection of the signal produced. It is not restricted to a 50 ohm system. Other systems such as, 75, 93 or even 300 ohms may be used with equivalent results, as long as it is a matched impedance system. The impedance match is maintained in the detector portion by maintaining a particular ratio between the outer diameter of the sensing rod 13 and the inner diameter of the sleeve 11 in accordance with well-known impedance matching techniques in coaxial transmission systems.

The oscilloscope, or other recording device, may be calibrated to measure the pulse energy as related to the measured pulse amplitude. The detector is capable of producing a response signal with a rise time in the order of 5 nanoseconds into a 50 ohm system.

The detector may be incorporated in a conventional laser source package by employing a partial mirror to reflect a portion of the laser beam to the detector mounted within the laser package.

Thus it will be seen that a very inexpensive laser pulse detector is provided which is operable over the entire laser light frequency spectrum with extremely fast response time. Although the invention has been illustrated by means of a specific embodiment, it will be obvious to those skilled in the art that various modifications and changes may be made in the described embodiment without departing from the scope of the invention as set forth in the following claims. For example, a tungsten, or other high temperature melting metal rod may be substituted for the graphite rod when detecting high power density beams. Graphite produces a plasma with less energy/unit area and is, thus, more sensitive.

What is claimed is:

1. A laser pulse detector comprising:
   a cylindrical electrically conductive housing having an open end for receiving laser beam pulses to be detected;
   an electrically conductive ablative rod coaxially disposed within and adjacent said open end of said housing so as to expose one end of said rod to said laser beam pulses to be detected;
   means for removably supporting said rod at its end opposite said one end and providing electrical output connection to said rod separate from said housing; and
   means for providing an electric field between said rod and said housing so that detection of a laser beam pulse is indicated by a pulse produced on said output connection.

2. The detector as set forth in claim 1 wherein means for providing an electric field between said rod and said housing includes a d.c. bias voltage source connected between said output connection and said housing and a coupling capacitor connected in series with said output connection for coupling to a utilization device the signal produced upon detection of a laser pulse of sufficient energy to produce a plasma in the area between said rod and said housing which provides current conduction therebetween.

3. The detector as set forth in claim 2 wherein said housing has an internal shoulder portion adjacent said exposed end of said rod to aid in establishing conduction between said one end of said rod and said housing during pulse detection.

4. The detector as set forth in claim 3 wherein said rod is a graphite rod.

5. The detector as set forth in claim 4 further including means for focusing said laser beam pulses onto said one end of said rod.

* * * * *